United States Patent [19]

Andersen

[11] Patent Number: 4,919,618
[45] Date of Patent: Apr. 24, 1990

[54] GAME BOARD WITH PLAYER FIGURES FOR TEACHING TEAM SPORTS

[76] Inventor: Ole Andersen, Oberstmuhle 3, CH-6370 Stans, Switzerland

[21] Appl. No.: 313,528

[22] Filed: Feb. 22, 1989

[30] Foreign Application Priority Data

Oct. 26, 1988 [DE] Fed. Rep. of Germany ... 8813456[U]

[51] Int. Cl.$^5$ .............................................. G09B 1/06
[52] U.S. Cl. ................................. 434/251; 434/247; 273/282; 273/285
[58] Field of Search ............... 434/251, 247, 248, 250, 434/430, 257, 80; 273/282 A, 155, DIG. 5, 285, 286

[56] References Cited

U.S. PATENT DOCUMENTS

| | | | |
|---|---|---|---|
| 2,585,924 | 2/1952 | Freedman et al. | 273/282 A |
| 2,586,017 | 2/1952 | Freedman | 273/282 A |
| 3,811,682 | 5/1974 | Neale et al. | 273/155 |
| 4,676,527 | 6/1987 | Palmer | 434/248 |

FOREIGN PATENT DOCUMENTS 2710793 9/1978 Fed. Rep. of Germany ... 273/282 A

Primary Examiner—Edward M. Coven
Assistant Examiner—Valerie Szczepanik
Attorney, Agent, or Firm—Browdy and Neimark

[57] ABSTRACT

A game board comprising a support of fiber web and of thin plates of polystyrene glued thereon at a distance from each other. A field marking corresponding to the field of the game to be analyzed is printed on the plates. Player figures of a laminate of an adhesive foil and a non-rigid PVC foil can be attached to the board. The figures stick by adhesion. In this form the board can be easily folded to a manageable size.

7 Claims, 2 Drawing Sheets

GAME BOARD WITH PLAYER FIGURES FOR TEACHING TEAM SPORTS

BACKGROUND OF THE INVENTION

Game boards with player figures for team sports having field markings of a playing field at a reduced scale and where the figures are to be removably disposed on the board are known through prior use. They comprise a reduced scale playing field made of a ferromagnetic plastic board with field markings and player figures provided with permanent magnets which magnetically adhere to the board. These game boards are used to analyze game situations as well as to describe the tactical steps used in combinations of moves on the board. The known game boards are well suited for use in team quarters. But they are ill suited for moving because they are bulky and heavy.

SUMMARY OF THE INVENTION

It is an object of the invention to recite a game board with player figures which is easily transportable and thus can have many uses. This object is attained by a game board with player figures designed for team sports, wherein the board has drawn on it field markings of a playing field at a reduced scale and wherein the figures can be disposed removably on the board. The board comprises a foldable, flat support and rectangular plastic plates, glued on the support at a distance from each other, which are rigid in comparison with the support and have smooth surfaces, on which the field markings are disposed. The gaps between the plates form fold lines, and the figures consist of a laminate of a thin adhesive foil on the back thereof and a thicker plastic foil laminated on the adhesive foil.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

An exemplary embodiment of the invention will be described below by means of the drawings, in which.

DETAILED DESCRIPTION OF THE PREFERRED EMBODIMENT

The game board 1 in accordance with the invention comprises a support 2 and sixteen rectangular plates 3 glued onto the support at short distances for each other. The support 2 is a tear-resistant white fiber web made of polyester fibers. The plates 3 are made of polystyrene of 0.4 mm thickness and have a smooth surface. White field markings 4, correct to scale and corresponding to the field of the team sport to be analyzed, are printed on them. The exemplary embodiment shown is a soccer field. The base color of the surface of the plate is green and it is practical to use two different tones of green in the configuration of a chessboard. The chessboard design has a grid with lateral lengths of, e.g. 5 m, multiplied by the reduction scale of the playing field. By means of this, the transfer of the positioning of the player onto the game board true to scale is made easier.

Figure 1:
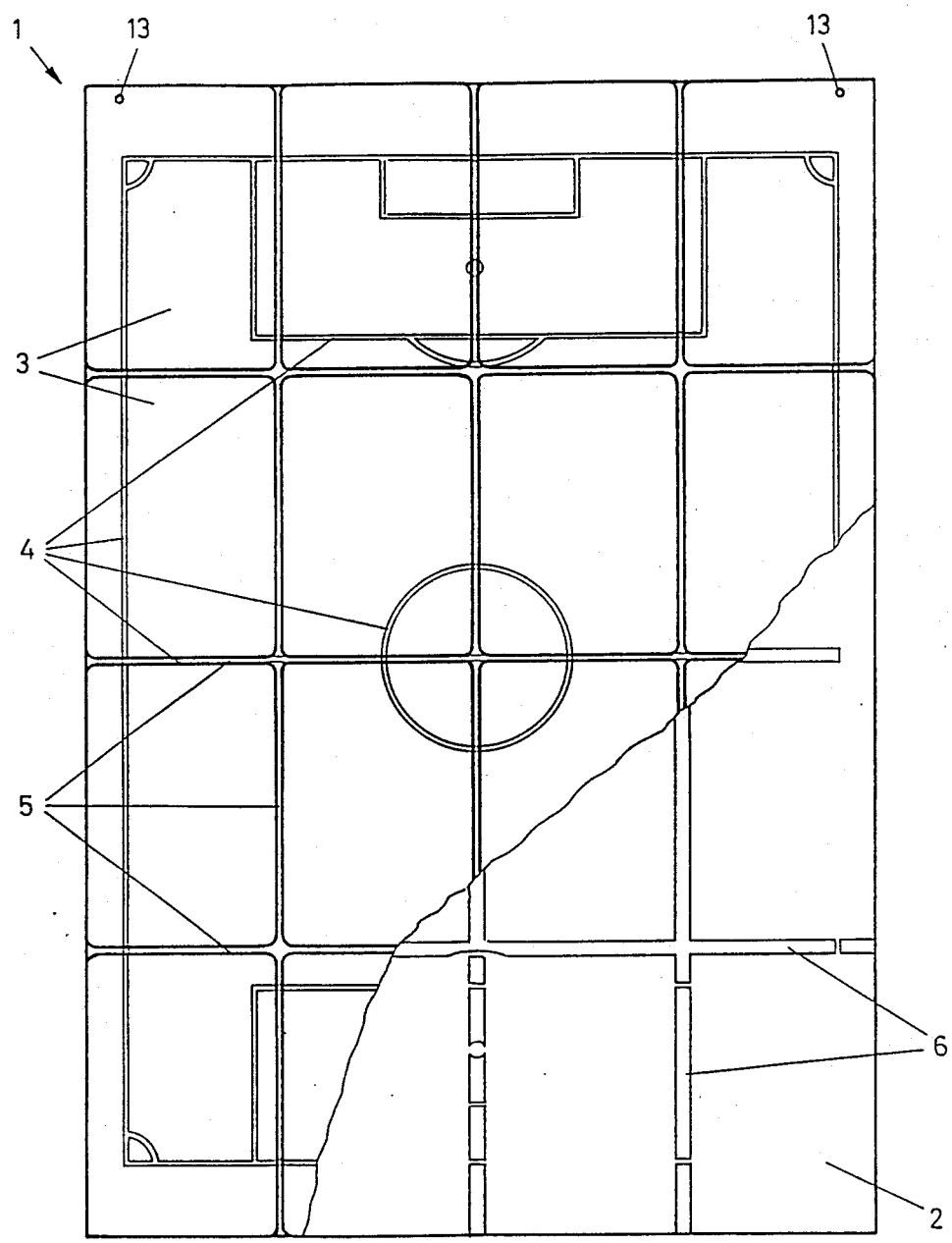
FIG. 1 is a game board.

Prior to the gluing of the plates, the support 2 is printed in green at the places where the gaps 5 between the plates 3 are located, with the exception of the places where the gaps 5 coincide with a field marking 4. The green print 6 can be seen in the lower right-hand corner of FIG. 1 where the plates 3 have been removed.

Figure 2:
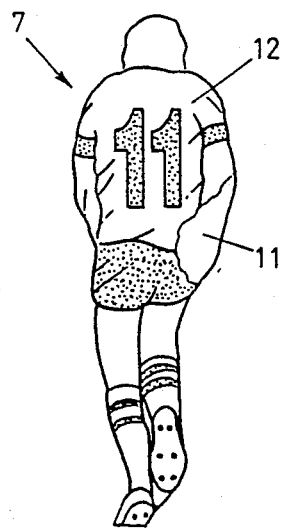
FIGS. 2 and 3 are two player figures.
Figure 3:
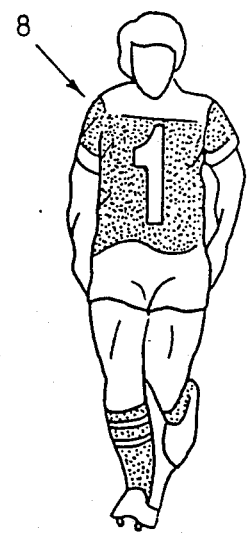
Figure 4:
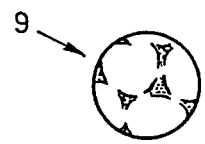
FIG. 4 is a ball.
Figure 5:
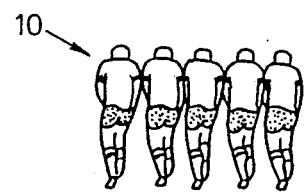
FIG. 5 is a figure of a player team.

The player figures 7, 8 shown in FIGS. 2 and 3 represent the player of two teams and are shown in an enlarged scale. The relationship of their size to the height of a player or to the ball diameter is larger than the playing field scale, so that the figures 7, 8 and the ball 9 are more easily visible on the board 1. On the other hand, the player team 10 in accordance with FIG. 5 is true to scale. It represents a "wall" of players during a free kick. The figures 7, 8, the ball 9 as well as the team 10 comprise a laminate made of a thin adhesive foil 11 of non-rigid or soft PVC at the back and of a thicker plastic non-rigid or soft PVC foil 12 of approximately 0.45 mm thickness laminated onto it. The foil 12 is printed on its surface. The foil 11 is a thin, non-sticky foil which is designed to adhere to the game board by adhesion.

To analyze a game or to study game moves, the board 1 is fixed, e.g. on a board. For this purpose the board 1 has on its one edge two holes 13 for the insertion of nails. The figures 7, 8 and the ball 9 are distributed on the playing field in accordance with the situation to be analyzed and stick to the plates 3 because of the adhesive foil 11. In a practical manner the surfaces of the plates 3 are such that they can be written on with water-soluble ink by means of a felt-tip pen. Starting with the situation displayed, the directions of movement of the players can now be put down by means of the felt-tip pen. For this purpose circular disks with numbers, made of the laminate of the FIGS. 7 to 10, may be useful to mark the progression in time of the player figures. For transport the board 1 can be folded flat to a manageable size along the gaps 5. Because the plates 3 are thin, the board 1 is light and can be easily transported so that it can also be used outside of the team quarters.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:
1. A game board with player figures for teaching team sports, said board comprising:
   field markings of a playing field drawn thereon at a reduced scale and wherein the figures can be disposed removably on the board;
   a foldable, flat support;
   rectangular plastic plates, glued on the support at a distance from each other forming gaps on the support between the plates, the gaps between the plates forming fold lines in the support along which the game board can be folded, said plates being rigid in comparison with the support and having smooth surfaces on which the field markings are disposed; and wherein the figures consist of a laminate of a thin adhesive foil at a back side thereof and a thicker plastic foil laminated on the adhesive foil.

2. A board in accordance with claim 1, wherein the support is a fiber web of polyester fibers.

3. A board in accordance with claim 1, wherein the plates are made of polystyrene.

4. A board in accordance with claim 1, wherein the support is white and the plate surface is a predetermined base color and the support is printed with the base color of the plate surface at the place of the gaps which do not coincide with a field marking.

5. A board in accordance with claim 1, wherein the adhesive foil consists of non-rigid PVC.

6. A board in accordance with claim 1, wherein the thicker plastic foil of the figures is made of non-rigid PVC.

7. In combination, a game board and player figures for teaching team sports, said board including field markings of a playing field drawn thereon at a reduced scale and comprising a foldable, flat support and rectangular plastic plates glued on the support a distance from each other forming gaps on the support between the plates, the gaps between the plates forming fold lines in the support along which the game board can be folded, said plates being rigid in comparison with the support and having smooth surfaces on which the field markings are disposed; and said figures consisting of a laminate of a thin non-sticky adhesive foil at a back side thereof which is adapted to adhere to the game board by adhesion to removably attach the figures of the game board and a thicker plastic foil laminated on the adhesive foil.

* * * * *